United States Patent [19]

Dimeff

[11] Patent Number: 4,528,858
[45] Date of Patent: Jul. 16, 1985

[54] FLOW METER

[76] Inventor: John Dimeff, 5346 Greenside Dr., San Jose, Calif. 95127

[21] Appl. No.: 608,585

[22] Filed: May 9, 1984

[51] Int. Cl.³ .............................................. G01F 1/24
[52] U.S. Cl. ................................................ 73/861.54
[58] Field of Search ........... 73/861.53, 861.54, 861.55, 73/861.57

[56] References Cited

U.S. PATENT DOCUMENTS

| | | | |
|---|---|---|---|
| 1,238,498 | 8/1917 | Dawley | 73/861.54 |
| 1,947,923 | 2/1934 | Schweitzer | 73/861.54 X |
| 4,235,105 | 11/1980 | Walters | 73/861.53 |
| 4,300,402 | 11/1981 | Dimeff | 73/861.54 |

Primary Examiner—Herbert Goldstein
Attorney, Agent, or Firm—Townsend and Townsend

[57] ABSTRACT

An improved flow meter has a vertical chamber of relatively constant cross-section. In this chamber a float resides having a corss-section only slightly less than the cross-section of the chamber. Fluid is introduced at the bottom of the chamber and flows to the top of the chamber. The chamber top is provided with relief port outletting through a chamber throttle value. Similarly, a passage through the float has a float throttle valve. The chamber throttle valve controls the back pressure on the float and provides adjustability to the lifting of the float at various pressure levels. The throttle valve provides adjustability to the range of flow to which positioning of the float responds. A series of apertures configured along the sides of the chamber open as the float moves upwardly in response to increasing fluid pressure in the chamber below the float. The flow meter is digitally sensitive on an analog basis to changes in flow. One of the chamber walls can be formed from a printed circuit board which includes apparatus for sensing the position of the float as well as the flow meter apertures. Calibration of the float sensors to float position is obviated by this arrangement.

17 Claims, 6 Drawing Figures

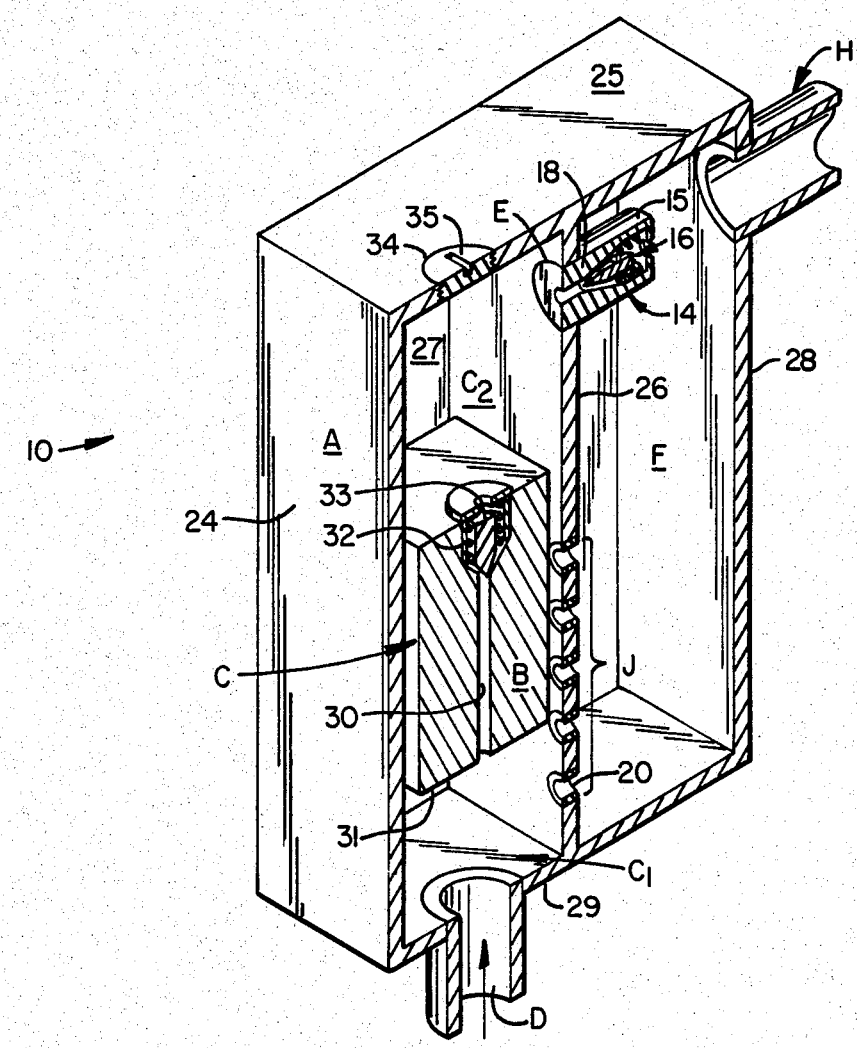
FIG._1.
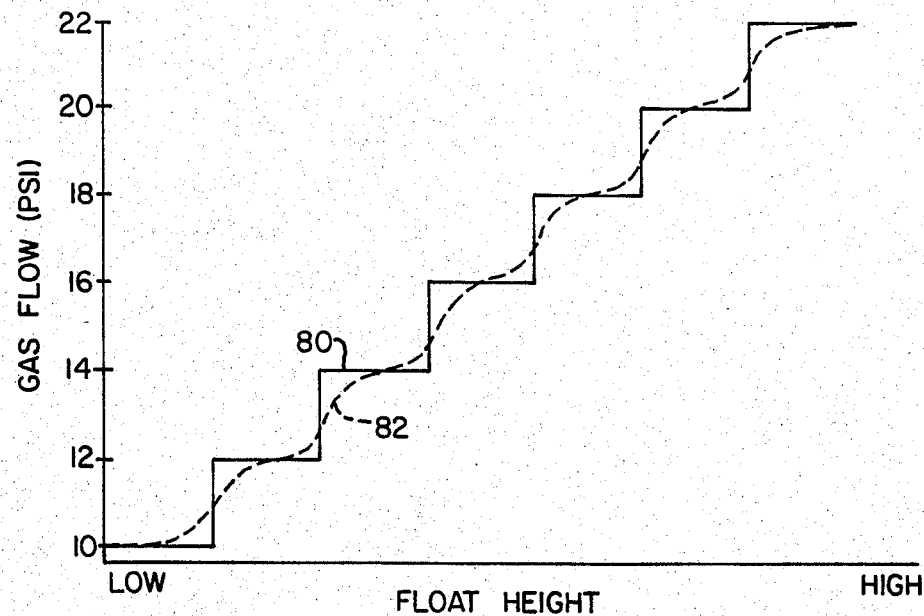
FIG._4.

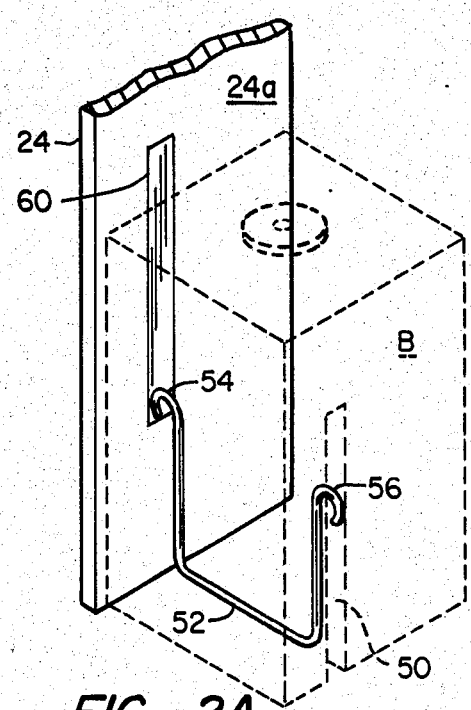
FIG._2A.
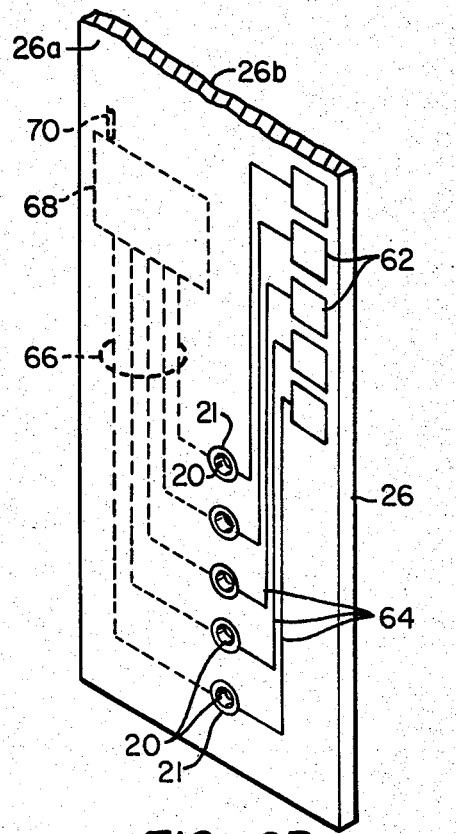
FIG._2B.
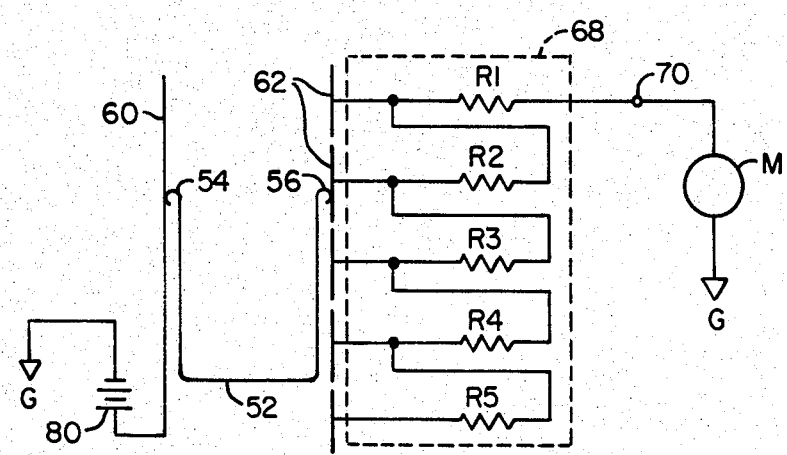
FIG._3.
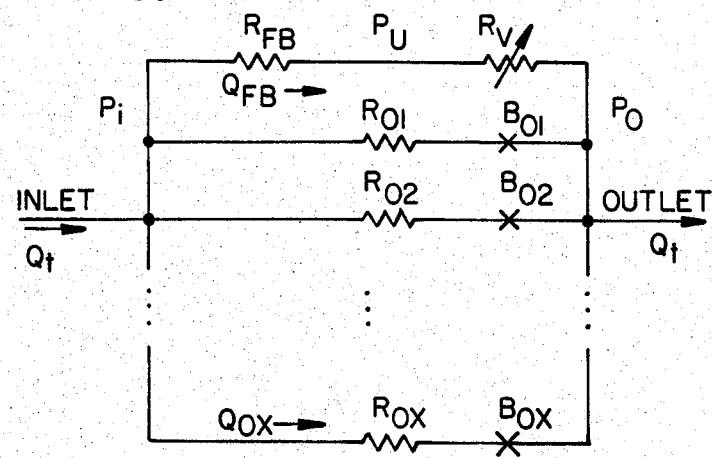
FIG._5.

FLOW METER

BACKGROUND OF THE INVENTION

This invention relates to flow meters and more specifically to a flow meter which has an adjustable range and a digitized indication of flow over an adjustable range of pressure change.

SUMMARY OF THE PRIOR ART

Float flow meters are known. Assuming that such flow meters are gravity biased, they usually consist of a vertical chamber with a float positioned therein. Typically, the chamber is tapered and the float placed there within to move upwardly with the flow of air. Air enters at the bottom of the chamber and typically flows around the float and out through holes at the top. For instance, a device was described within which the chamber was frustroconical in shape and became larger in cross-section away from the air entrance at the bottom of the chamber.

In order to modify or change the operating range of flow meters of the type to which this invention is directed, it was necessary to change the operating parts of the flow meter itself. Thus, for example, either the weight of the float was changed, its geometry, or both. This could be both time-consuming and expensive, not to mention inconvenient.

SUMMARY OF THE INVENTION

An improved flow meter has a vertical chamber of relatively constant cross-section. In this chamber a float resides having a cross-section only slightly less than the cross-section of the chamber. Fluid introduced at the bottom of the chamber causes the float to move upward toward the top of the chamber. A series of apertures, formed along the sides of the chamber, are opened as the float moves upwardly in response to increasing fluid pressure in the chamber below the float.

The chamber top is provided with relief port outletting through a chamber throttle value. Similarly, a passage through the float has a float throttle valve. The chamber throttle valve controls the back pressure on the float and provides adjustability to the lifting of the float at various pressure levels. The throttle valve thereby provides adjustability to the range to which positioning of the float responds. One of the chamber walls can be formed from a printed circuit board which includes apparatus for sensing the position of the float as well as the flow meter apertures. Calibration of the float sensors to float position is obviated by this arrangement

OTHER OBJECTS AND ADVANTAGES

An object of this invention is to provide a flow meter which has a readily adjustable flow range. According to this aspect of the invention, a vertical chamber of relatively constant cross-section has a float placed therein. The float has a cross-section which is only slightly less than the cross-section of the chamber. A small and adjustable portion of the fluid introduced at the bottom of the chamber flows to the top of the chamber around the float. The top of the chamber is vented to the outlet of the flow meter through an adjustable valve. Back pressure on the top of the float is adjustably determined, being the pressure at the outlet of the flow meter plus the pressure drop caused by the amount of fluid flowing past the float and through the valve and the adjustable pneumatic resistance of the valve. The float is buoyantly supported by the difference between the inlet pressure existing at the bottom of the float and the adjustable pressure at the top chamber. Since this buoyant force must be just sufficient to support the float, however, the float can be supported only when the pressure difference between the inlet chamber and the outlet chamber of the flow meter rises. The fraction of that difference appearing across the float can counteract the gravitational or spring force forcing the float toward the inlet.

An advantage of this aspect of the invention is that by adjusting the back pressure on the float, the pressure for float movement is adjustable. Adjustment of the valve has an effect similar to replacement of the float and the addition of successively heavier floats, each float being used for different pressure ranges.

A further advantage of chamber back pressure adjustment is that the *entire* operating range of the meter is adjustable. Not only does the threshold or lift off pressure of the flow meter change, but additionally the increment pressure between the uncovering of successive ports likewise changes. Adjustability of the entire operating range of the flow meter results.

A further object of this invention is to disclose in a float having an adjustable lifting threshold a digitized movement. According to this aspect of the invention, the chamber is provided with a series of apertures. These apertures—typically circular—are relatively spaced along the sidewall of the float and arranged to be successively uncovered as the float moves upwardly. With greater upward movement, more apertures are uncovered.

An advantage of this aspect of the invention is that the float moves upwardly in response to increasing flow within the meter in a digital fashion. Movement occurs in discrete steps with movement occurring responsive to small changes in flow with relatively large changes in height. A flow meter which is ideal for calibrating instruments to narrow flow and/or pressure changes is disclosed.

A further object of this invention is to disclose a float position detector which does not require individual adjustment. According to this aspect of the invention, one of the sides of the enclosure for the float is made from a PC board. This board is provided with means for sensing the float position, such as a commutator like wiper on the float. Once the float is enclosed by the PC board, both the manifolding apertures to the float chamber and the commutator for float position are synchronously assembled. Consequently, relative calibration of these respective apertures is not required.

Other objects, features and advantages of this invention will become more apparent after referring to the following specification and attached drawings in which:

DESCRIPTION OF THE DRAWINGS

FIG. 1 is a perspective view of a flow meter constructed according to this invention illustrating the apparatus in section;

FIGS. 2A and 2B are perspective views of the float, and portions of the chamber in which the float travels, used in the flow meter of the present invention, illustrating the use of a commutator structure to provide an electrical signal that is indicative of float position in the chamber;

FIG. 3 is a schematic of the electrical circuit used in conjunction with the commutator structures shown in FIGS. 2A and 2B;

FIG. 4 is a graph illustrating the digitized movement of the float responsive to changing pressures to the flow meter; and FIG. 5 is an electrical analog circuit of the flow meter of this invention.

DETAILED DESCRIPTION OF THE PREFERRED EMBODIMENT

Referring to FIG. 1, the flow meter of the present invention, designated generally with the reference numeral 10, is shown as including a housing A contains a float B within an inlet chamber C with inlet chamber C being divided by float B into lower chamber C1 and upper chamber C2. An inlet port D allows passage of a fluid into the lower chamber portion C1. Air leaks by the float B from lower chamber C1 and into upper chamber C2. Responsive to the pressure difference between the lower and upper chambers C1 and C2 caused by this flow of air, float B is raised. From upper chamber C2 air passes from exhaust port E into an air discharge chamber F and out through a relief port H. The exhaust port E from upper chamber C2 is throttled by a needle valve 14 with needle 16 for adjusting the back pressure in upper chamber C2 on float B.

Exhaust chamber F and active chamber C are divided by wall 26 that is provided with a number of linearly disposed apertures 20 collectively described as manifold J. For reasons that will become clearer below, the interior surfaces of the apertures 20 are provided with an electrically conductive plating 21. As here illustrated, manifold J includes six spaced circular apertures 20. As float B rises corresponding to increased pressure, successively greater number of apertures 20 are uncovered. With the successive uncovering of these apertures, an additional and controlled leakage occurs between chamber C and exhaust chamber F directly through the manifolding, bypassing the float. As will hereinafter be emphasized more completely, an essentially "digitized" movement of the float B occurs.

Inlet chamber C is formed from partitions in housing A. The chamber C is formed by two sidewalls 24, 26, a rear wall 27, an upper chamber wall 25 and a lower chamber wall 29. In addition, a front substantially planar wall (not shown for reasons of clarity), parallel to the rear wall 27, extend from and between the walls 24, 25, 29, and a side wall 28 (forming, with sidewall 26, discharge chamber F) to enclose in an airtight manner the two inlet and discharge chambers C and F. The side walls 24, 26, 27 and 28 (and a front wall—not shown) forming chamber C define an essentially rectangular cross-section. Here, this rectangular cross-section is only slightly greater than the rectangular cross-section of the float B.

Needle valve 14 is of conventional design, having a housing 15 and needle 16 threadably mounted to the interior of a valve seat 18. By adjustment of the needle 16, back pressure in the upper chamber C2 is adjustable under the dynamics of fluid flow in the meter. Such adjustment can typically be made through exhaust port H, with which the needle valve 14 is axially aligned, by means of a screwdriver.

Float B is configured with an air passage 30 passing therethrough. Air passage 30 has located at one end a second needle valve 32. The needle valve 32, by its needle 33, similar to needle valve 14, is shown here as being capable of adjustment. This need not necessarily be the case; that is, both needle valves 14 and 32 need not be adjustable. For most cases it may be sufficient to fix one for operation within a desired range, and to allow the other to remain adjustable so that operation within selected range can be modified as needed.

The upper chamber wall 25 is provided with an aperture 34 that is axially aligned with the needle valve 32 to provide access thereto for adjustment. A threaded plug 35 seals aperture 34 when any necessary adjustments to the needle valve 32 are completed.

As will hereinafter be emphasized, the needle valves 14 and/or 32, when adjusted, affect the range of differential pressures under which the meter is operable. These available adjustments provide a quick, efficient and simple technique for changing the range of operation of the flow meter 10.

One technique to read the flow meter 10 is to make the walls forming the housing A transparent so that the relative position of the float B can be viewed. Markings can be used to translate float position to flow rate.

FIGS. 2A and 2B illustrate another and preferred method used to determine the relative position of the float B within the inlet chamber B and therefore, the fluid flow therethrough. As shown in FIG. 2A, the float B is provided with continuous channel 50 that receives a commutator wire 52. The channel 50 is closed at 51 (on both sides) to inhibit fluid flow around the float B. The ends 54 and 56 of the commutator wire are respectively formed and configured to slidably engage a commutating bus 60, formed on the interior-facing surface 24a of the sidewall 24 and a series of commutator segments 62 (FIG. 2B) formed on the surface 26a of the sidewall 26 that faces the inlet chamber C (FIG. 1).

FIG. 2B shows that the commutator segments 62 are each electrically connected to the plating 21 of a corresponding aperture 20 by electrical traces 64. As FIG. 2B also shows (in phantom), the backface 26b of the sidewall 26 is provided with electrical traces 66 which connect the platings 21, and therefore the commutator segments 62, to a resistor array 68. An output terminal 70 extends from the resistor array 68.

FIG. 3 illustrates the electrical circuit that incorporates the electrical connections described above. A source of electrical energy, here a battery 80, is connected between the commutator bus 60 and a common G. The resistor array 68 includes resistors R1-R5, connected to one another in series fashion, and to the commutator segment 62 in parallel—as shown. The terminal 70 of the resistor array is adapted to be connected to a current meter M, which in turn connects to the common G. The ends 54 and 56 of the commutator wire 52 (carried by the float B—see FIG. 2A) rides along the commutator bus 60, engaging certain of the commutator segments 62, thereby providing an electrical signal at the output terminal 70 that is indicative of the relative position of the float B.

Preferably, the commutator bus 60, commutator segments 62, electrical traces 64 and 66, and platings 21 are formed using printed circuit techniques. The resistor array 68 is preferably formed using a commercially available resistor package or individual resistors. The values of the resistances R1-R5 can be chosen to meet any desired parameters. Finally, the spacings between adjacent ones of the commutator segments 62, and the relative location of these spacings should be such that the end 56 of the commutator wire 52 will bridge the spacing and electrically engage two adjacent commutator segments 62 when the bottom 31 (FIG. 1) of float B is just about to uncover an aperture 20.

Having set forth the construction of the flow meter, its operation can now be described.

In operation, an inlet fluid is introduced to the flow meter 10 at the inlet port D, through the bottom wall 29, and into the lower chamber C1. Before float B lifts, the fluid pressure in the lower chamber C1 must increase until a pressure differential between the lower and upper chambers C1 and C2 is sufficient to counteract the weight of float B. When the pressure in the lower chamber C1 exceeds that of the upper chamber C2 plus the weight of the float B, float B begins to lift. At this point, there will be a controlled leakage around the surfaces of float B.

Neglecting any side leakage that may pass through manifolds J, leakage will occur to upper chamber C2. Exhaust from chamber C2 must occur for the float B to lift properly. At this point it can be recognized what increased back pressure (as by adjustment of needle 16 in needle valve 14) will cause. Specifically, it can cause back pressure in chamber C2 to rise. This in turn will increase the pressure required to cause float B to lift. Stated in other terms, the two flow resistances, the first flow resistance being the constant (and here unadjusted) fluid bypass leakage around the float B, and the second being the adjustable resistance of the flow permitted through needle valve 14, function to determine the operating range of the flow meter 10. Note that these resistances are in series.

The effect of these series of resistances can be readily understood. Specifically, by increasing the back pressure through adjustment of the needle valve 14, increasingly higher pressure differences between the lower chamber C1 and the chamber F will be required for float B to lift. The effect of this adjustment of needle valve 14 on float B will be as if the float's weight were increased. Thus, even though float B is effectively "sealed" from the outside, its effective weight may be adjusted by the penetration of a screwdriver through exhaust port H to adjust needle 16.

As noted above, the float B may also carry a needle valve 32 which can be adjusted. The effect of this adjustment is to increase (or decrease, depending upon the adjustment) the flow resistance presented by the float B. With decreasing flow resistance—as by opening of the needle 33 in the needle valve 32—the range over which the float B is operable increases. Therefore, lifting of the float B must utilize a greater pressure differential between the lower chamber C1 and upper chamber C2. In effect, the total range of operable pressures over which the apertures 20 of manifold J are successively uncovered is expanded by adjustments of the needle valves 14 and 33.

Assuming adjustment of the paired needle valves 14 and 33, it will be seen that the valve will operate in a digitized manner. Specifically, float B will operate to successively uncover apertures 20 in the manifolding J between the inlet chamber C and exhaust chamber F.

Referring to FIG. 4, assuming a fluid running through the valve, float height can be plotted as a function of gas flow and/or pressure across the meter. First, and referring to the ordinant axis, gas flow is plotted with float height being represented along the abscissa. Dependent upon the resistance of initially uncovered manifold J coupling inlet and exhaust chambers C and F, the flow necessary for the float to lift will be adjustable. In the example here shown, the resistance is set to lift at 10 units of flow. The reader will understand that the flow here shown can be set at other initial lifting pressures.

Additionally, the force applied to the float and the needle valve adjustments are chosen so that an increment of lifting occurs at approximately every two units of flow. Specifically, and by adjusting needle 33, the pressure differential across the specific increments of valve movement can be adjusted.

Shown on FIG. 4 are performance curves 80 and 82. Performance curve 80 represents the kind of "digitized" operation that results from having the manifolding formed by the linear arrangement of apertures. This digitization can be modified and enhanced by forming the apertures 20 as narrow slots, with the narrow dimension of each slot formed parallel to the direction of the float motion. Curve 82 represents a calibration obtained by having apertures 20 arranged as circular apertures. Other calibrations, linear or nonlinear, stepped or continuous, can be obtained by adjusting the size, shape and orientation of apertures 20 to meet the requirements.

Referring to FIG. 5, the operating principles of this invention can be emulated with reference to the analog circuit diagrams. Let the pneumatic "circuit" of the invention be represented by the diagram of FIG. 5 where Q, P, and R represent fluid flow, pressure and resistance to flow, respectively, and where the subscript t represents total;
i represents inlet;
o represents outlet;
on represents orifice number;
FB represents float bypass;
v represents valve, adjustable; and
u represents upper chamber.

The float associated with $R_{FB}$ is biased toward the inlet by gravitational force, by a spring, or other expedients. As it is forced by the fluid flow to move away from the inlet, it uncovers an increasing number of the apertures 20 providing parallel flow pathways between the inlet chamber C and the exhaust chamber F. For the float to be supported by the fluid requires that the buoyant force F be equal to the force F tending to move the float toward the inlet. That is $$F = (P_i - P_u)A \tag{1}$$

where A is the surface area of the bottom 31 of the float.

It is clear from the pneumatic circuit that $$(P_i - P_o) \times \left( \frac{R_{FB}}{R_{FB} + R_v} \right) = (P_i - P_u) \tag{2}$$

from which we obtain $$P_i - P_o = \left( 1 + \frac{R_v}{R_{FB}} \right) \frac{F}{A} \tag{3}$$

It is also clear from the circuit that:

$$Q_t = \sum_{x=1}^{x=N} Q_{ox} + Q_{FB} \tag{4}$$

$$= \frac{P_i - P_o}{R_o} + \frac{P_i - P_o}{R_{FB} + R_V}$$

-continued $$= (P_i - P_o)\frac{N}{R_o}\left(1 + \frac{R_o}{N(R_{FB} + R_v)}\right)$$

or, from equation (3) and (4)

$$Q_t = F\left(1 + \frac{R_v}{R_{FB}}\right)\frac{N}{AR_o}\left(1 + \frac{R_o}{N(R_{FB} + R_v)}\right)$$

If we design the system so that $(R_{FB}=R_v)<<R_o$ the total flow can be described as being dependent on two factors: that is $Q_t = F'GN$
where $$G \equiv \frac{1}{R_o A}$$

is a geometrical factor determined in the initial design of the instrument, and $$F' \equiv F\left(1 + \frac{R_v}{R_{FB}}\right)$$

is a virtual force pushing the float toward the inlet and determined by the controllable ratio of the resistances of the valve, $R_v$, and the pathway around the float (or through the float) $R_{FB}$.

Thus, the *total* flow is always directly proportional to the number N of orifices uncovered by the float, but is adjustably controlled by the restricting valve coupling the upper chamber to the outlet.

The initial action of the flow meter 10 is dependent on the design. That is, if the float is initially positioned so as to cover all of the side wall orifices, the input flow must increase only to the small valve $Q_{FB}$ (see above) to lift the float from its initial position.

If, however, the initial position of the float is arranged to allow one orifice to remain uncovered, that orifice providing a flow pathway between the input and output of the flow meter, the float will not move until the pressure drop across that orifice is sufficient to cause $Q_{FB}$. The size of this first orifice can be adjusted to provide a controlled initial bias—allowing the flow meter to act as a sensitive "vernier" indicator, reading a small flow range within a much larger total flow.

If the response desired of the flow meter is non-linear, it can be obtained by adjusting the design either by introducing (a) a non-linear relationship in the positioning of the wall apertures; or (b) a variability in the resistance to flow of the several wall apertures.

The mounting of the commutator segments 62 onto sidewall 26 of the chamber C has an unexpected advantage. Specifically, and in the calibration of such meters in the past, the means for detecting position of float B and the position of the readout has always heretofore had to be separately adjusted. In the present invention it can be seen that adjustment is no longer required. Specifically, the detecting commentator segment 62 and the location of each of the successive apertures 20 in the manifold series J is fixed upon manufacture. Thus, by designing the board to predetermined standards, the relationship between the apertures 20 forming manifold J and the commentator segments 62 for the position of the float B can readily be determined.

The reader will understand that this invention will admit a number of modifications. For example, the float B here illustrated is illustrated as being preferably biased by gravity. It will be apparent that the float could be biased by other means, for example, springs and the like. Moreover, the float has been illustrated as being rectangular in section moving within a rectangular chamber. It will be appreciated that the geometry of the float could be circular in cross-sections or of other geometric configurations as well.

Likewise, in FIGS. 2A and 2B, a preferred embodiment of the invention, we have illustrated a commutator-like configuration. Other means of detecting the position of the float could as well be used. In fact, commutators represent a gross and less sensitive means of determining float position. However, in many applications such simple mechanical contacting devices are actually preferred to more sophisticated means of detecting float position. Other features and natural modifications of this invention will occur to those having skill in the art.

What is claimed is:

1. A device for measuring the flow of fluids, comprising: a housing defining a chamber of generally constant cross-section, said chamber having a fluid entrance port communicated at one end and a fluid exit port communicated at the other end; a float positioned in said chamber intermediate the fluid entrance and exit ports and being of lesser but complimentary cross-section to that of said chamber, said float being biased for movement toward said fluid entrance port, said chamber including a series of apertures therein that are at least partially obstructable by said float when said float is biased toward said fluid entrance port, said float being movable in response to fluid pressure at said fluid entrance port to successively uncover said apertures to permit fluid flow from said chamber; and means for adjustably throttling fluid exiting said other end of the chamber, whereby the response of said float reacts at varying pressure ranges to vary the scale of response of said float.

2. The invention of claim 1 wherein said float includes first means for providing fluid communication between the entrance port and the exit port through said float, including a passage therethrough; and second means within said passage for adjusting the rate of fluid flow through said first means.

3. The invention of claim 1 and including means for sensing the position of said float in said chamber.

4. The invention of claim 3, wherein the sensing means includes a number of electrically conductive, spaced, commutating segments formed on a first portion of an interior surface of said chamber, a length of conductive material formed on a second portion of the interior surface of said chamber, and means carried by said float for establishing electrical communication between the length of conductive material and ones of the commutating segments as said float moves within said chamber.

5. The invention of claim 4, including resistance means electrically coupled to the commutating segments in a manner that causes a decreasing resistance value to be exhibited at a terminal that is coupled to said resistance means as said float moves in one direction in said chamber.

6. The invention of claim 1 and wherein said fluid entrance port is at the bottom of said chamber, said fluid exit port is at the top of said chamber, and said float is gravity biased.

7. A device for measuring the flow of fluids comprising in combination: a housing defining a vertical chamber of generally constant cross-section, said chamber having a fluid entrance port communicated to a bottom section thereof and a fluid exit port communicated to a top section thereof; a float of lesser but complementary cross-section to the cross-section of said vertical chamber, said float biased for movement towards said fluid entrance port and away from said fluid exit port; said housing having a series of apertures therein and into said chamber, at least some of the apertures being at least partially obstructed by said float, said float being movably responsive to increased fluid pressure at the bottom section of said chamber to successively uncover said apertures to permit fluid flow from said chamber; a passageway extending through said float communicating the bottom section of said chamber to the top of said chamber; means for adjustably controlling fluid communication through the passageway of said float.

8. The device according to claim 7 and wherein said float includes an adjustable passageway therethrough for bypassing a predetermined amount of fluid from the entrance port side of said float to the exit port side of said float.

9. The device of claim 7, including means for adjustably restricting fluid flow through the passageway of the float to the top section of the chamber.

10. The device of claim 7, wherein said controlling means includes first fluid restriction means coupled to the float and second restriction means coupled to the fluid exit port.

11. The invention of claim 7 and wherein said float is gravity biased.

12. The invention of claim 7 and wherein a side of said chamber is found by a printed circuit board.

13. The invention of claim 12 and wherein said side of said chamber closed by said printed circuit board includes apertures therein.

14. The invention of claim 13 and wherein said printed circuit board includes means for the sensing of position of said float within said chamber.

15. In a flow meter of the type having a sidewall defining a chamber of constant cross section, said chamber having a fluid entrance port and a fluid exit port relatively spaced apart from one another; a float contained in said chamber and between said fluid entrance and exit ports, said float being biased for movement toward the fluid entrance port and away from the fluid exit port of said chamber, and having a dimension less than the inside dimension of said chamber so that said float moves in response to fluid pressure introduced at said fluid entrance port; the side wall of said chamber having a series of apertures therein to manifold said chamber; at least some of the apertures manifolding said chamber being at least partially obstructable by said float as said float is biased toward said fluid entrance port, said float being movably responsive to increased fluid pressure at the fluid entrance port to successively uncover said apertures to permit fluid flow from said chamber; the float including means for adjustably controlling fluid exiting from the fluid exit port of said chamber, whereby the response of said float reacts at varying pressure ranges to vary the scale of response of said float.

16. The invention of claim 15 and wherein said float is gravity biased.

17. The invention of claim 15 and wherein at least a portion of the sidewall of said chamber is formed by a printed circuit board; said printed circuit board having the apertures of said flow meter configured therein and having means for sensing the position of said float along said chamber sidewall.

* * * * *